US008859656B2

(12) United States Patent
Suau et al.

(10) Patent No.: US 8,859,656 B2
(45) Date of Patent: Oct. 14, 2014

(54) EMULSION OF AN ASSOCIATIVE ACRYLIC POLYMER POLYMERISED IN THE PRESENCE OF POLYGLYCEROLS AND ITS USE AS A THICKENING AGENT IN AN AQUEOUS FORMULATION

(71) Applicant: Coatex S.A.S., Genay (FR)

(72) Inventors: Jean-Marc Suau, Lucenay (FR); Denis Ruhlmann, Genay (FR)

(73) Assignee: Coatex, Genay (FR)

( * ) Notice: Subject to any disclaimer, the term of this patent is extended or adjusted under 35 U.S.C. 154(b) by 12 days.

(21) Appl. No.: 13/659,948

(22) Filed: Oct. 25, 2012

(65) Prior Publication Data

US 2013/0116368 A1 May 9, 2013

Related U.S. Application Data

(60) Provisional application No. 61/556,321, filed on Nov. 7, 2011.

(30) Foreign Application Priority Data

Nov. 4, 2011 (FR) ..................................... 11 60010

(51) Int. Cl.

*C08F 2/24* (2006.01)
*C08L 33/02* (2006.01)
*C08L 33/14* (2006.01)
*C08F 2/30* (2006.01)
*C08F 220/18* (2006.01)
*C08L 33/08* (2006.01)
*C09D 7/00* (2006.01)
*C09J 11/08* (2006.01)

(52) U.S. Cl.

CPC . *C08F 2/24* (2013.01); *C08L 33/02* (2013.01); *C08L 33/14* (2013.01); *C08F 2/30* (2013.01); *C08F 220/18* (2013.01); *C08L 33/08* (2013.01); *C09D 7/002* (2013.01); *C09J 11/08* (2013.01); *Y10S 526/932* (2013.01)

USPC ........... 524/156; 524/761; 524/166; 524/161; 524/376; 524/377; 524/320; 524/558; 526/238.2; 526/318.41; 526/318.44; 526/321; 526/932

(58) Field of Classification Search

CPC ...... C08F 2/24; C08F 2/30; C08F 2220/1808; C08F 220/06; C08F 220/20; C08L 33/02; C08L 33/08; C08L 33/14; C09D 7/002

USPC ......... 524/156, 761, 166, 161, 376, 377, 320, 524/558; 526/238.2, 318.41, 318.44, 321, 526/932

See application file for complete search history.

(56) References Cited

U.S. PATENT DOCUMENTS 6,140,435 A * 10/2000 Zanotti-Russo ........... 526/238.2
8,202,361 B2 6/2012 Fechner et al.
2010/0152375 A1* 6/2010 Kensicher ..................... 524/591
2011/0107803 A1 5/2011 Fechner et al.
2011/0213071 A1* 9/2011 Suau et al. .................... 524/558
2011/0213072 A1* 9/2011 Suau et al. .................... 524/558

FOREIGN PATENT DOCUMENTS

DE 10 2007 039 783 A1 2/2009

OTHER PUBLICATIONS

U.S. Appl. No. 13/667,040, filed Nov. 2, 2012, Ruhlmann, et al.
International Search Report issued Jan. 17, 2013 in PCT/FR2012/052341 with English translation of categories of cited documents.
U.S. Appl. No. 14/356,061, filed May 2, 2014, Ruhlmann, et al.

* cited by examiner

*Primary Examiner* — Michael M Bernshteyn

(74) *Attorney, Agent, or Firm* — Oblon, Spivak, McClelland, Maier & Neustadt, L.L.P.

(57) ABSTRACT

Emulsions containing acrylic associative thickening agents which, when polymerized in the presence of particular polyglycerols, have a thickening power which is remarkably stable over time.

20 Claims, No Drawings

EMULSION OF AN ASSOCIATIVE ACRYLIC POLYMER POLYMERISED IN THE PRESENCE OF POLYGLYCEROLS AND ITS USE AS A THICKENING AGENT IN AN AQUEOUS FORMULATION

REFERENCE TO PRIOR APPLICATIONS

This application claims priority to U.S. provisional application Ser. No. 61/556,321, filed Nov. 7, 2011; and to French patent application 11 60010, filed Nov. 4, 2011, both incorporated herein by reference.

FIELD OF THE INVENTION

The present invention relates to new emulsions containing acrylic associative thickening agents which, when polymerized in the presence of particular polyglycerols, have a thickening power which is remarkably stable over time. The viscosimetric variance caused by this type of thickening agent, which appears very rapidly after several days' storage, is notably reduced by this means, in particular in paints with low VOC (Volatile Organic Compound) rates, or paints without VOCs. The user is thus guaranteed identical application properties for their paint, i.e. an unvarying rheological profile for the paint they formulate, and which they apply, independently of the storage time of the paint, over a period which can be as long as several months.

Additional objects, advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND OF THE INVENTION

Controlling the rheology of a paint both in the stage of its manufacture, and during its transport, storage or use, remains a priority at the current time. The wide variety of constraints observed in each of these steps relates to a multiplicity of different rheological properties. Nevertheless, it is possible to summarise the requirement of the skilled man in the art in obtaining an effect of the thickening of the paint, both for reasons of stability over time, and for a possible application to a vertical surface, lack of spattering during use, or of sagging after application, etc. As a consequence, the products which contribute to this regulation of the rheological properties have been designated by the term "thickening agents".

Historically, since the 1950s cellulose-based gums and products have been used, one of the essential characteristics of which is their high molecular weight.

However, these compounds have a number of disadvantages, such as their instability over time (see document U.S. Pat. No. 4,673,518), the need to use a large quantity of them (see document EP 0 250 943 A1), and their production costs, notably in terms of waste treatment (see document U.S. Pat. No. 4,384,096).

Thickening agents called "associative" thickening agents were then created: these are water-soluble polymers having insoluble hydrophobic groups. Such macromolecules have an associating character: when introduced into water, the hydrophobic groups tend to assemble in the form of micellar aggregates. These aggregates are linked together by the hydrophilic parts of the polymers: a three-dimensional network is then formed which causes the viscosity of the medium to be increased. The operating mechanism and their characteristics are now well known and described, for example in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these associative thickening agents, a technological platform is known which contains particular emulsions known as "HASE" (Hydrophobically modified Alkali-Soluble Emulsions). These contain polymers of (meth) acrylic acid, of an ester of these acids and of an associative monomer consisting of an oxyalkylated chain terminated by a hydrophobic group.

In the case of these associative monomers, the choice of hydrophobic group determines the varied rheological properties. The following patent applications filed by Coatex™ may be cited with this regard: EP 0 577 526 A1, which describes a fatty chain with linear or branched units of the alkyl and/or aryl type, having 26 to 30 carbon atoms, to develop high viscosities under a low shearing gradient, and EP 1 778 797 A1, which describes a branched terminal chain comprising 10 to 24 carbon atoms, to improve the pigmentary compatibility, and increase the viscosity generally.

However, associative thickening agents—and notably HASE—have a tendency to cause viscosities which may increase over the storage time, from the time when they are introduced into a paint. It is, indeed, well known that the thickening power which they develop tends to increase over time, when they are associated in the paint with binders which require no or little in the way of coalescence aid agents: this trend can generally be observed 8 days after formulation. Such variance is not desirable, since it is synonymous with a loss of control of the paint's rheological profile.

SUMMARY

The inventors have now developed a new method for manufacturing aqueous emulsions containing HASE-type thickening agents, involving the use of particular polyglycerols. The resulting products develop viscosities which are completely stable within the paint formulations in which they are incorporated: a simple and effective solution is therefore found to the problem of rheological variance as mentioned above.

One of the characteristics of the polyglycerols in question, in addition to their chemical nature, is based on the fact that they are used during the synthesis of HASE-type thickening agents: in this sense, these are "polymerization surfactants". Conversely, "formulation surfactants" are used after the polymerization of the thickening agents, notably in order to use the finished product obtained after polymerization in water.

The use of surfactants during polymerization of an acrylic associative thickening agent is already known: it is notably described in document WO 2009 019225 A1. Furthermore, it is already known to use glycerol during the same type of synthesis, as disclosed in document WO 98 06757 A1. Nevertheless, nothing described or suggested that the use of polyglycerols, as polymerization surfactants, was likely to lead to new aqueous emulsions containing HASE-type associative thickening agents, giving, e.g., the paints into which they are introduced particularly stable viscosities.

DETAILED DESCRIPTION OF THE PREFERRED EMBODIMENTS

An object of the invention is an aqueous emulsion of an associative thickening agent obtained by polymerization:

a) of at least one monomer which is (meth)acrylic acid, and preferentially methacrylic acid, b) of at least one monomer which is an ester of (meth) acrylic acid, and preferentially ethyl acrylate, c) of at least one monomer having at least one hydrophobic group, characterised in that d) at least one polyglycerol of formula (I) is used during the polymerization (I)

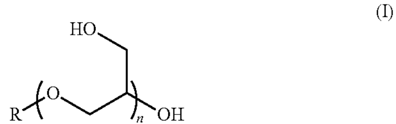

where R designates hydrogen, an ester group functionalized by an alkyl group, having 8 to 22 carbon atoms, or an alkyl group having 8 to 22 carbon atoms, and preferentially an alkyl group having 8 to 22 carbon atoms.

This emulsion may also be characterised in that, for the associative thickening agent obtained by polymerization, the polymerization comprises a first step of introducing into water compounds d) and the surfactants other than the compounds d), followed by a second step of increasing the temperature of the medium, followed by a third step of introducing polymerization initiators, and then monomers, possibly added in combination with water and surfactants other than compounds d).

This emulsion may also be characterised in that, for the associative thickening agent obtained by polymerization, in the polymerization the surfactants other than compounds d) are chosen from among the anionic surfactants, and preferentially from among sodium dodecyl sulphate, dioctyl sodium sulfosuccinate, sodium dodecylbenzenesulfonate, the non-ionic surfactants, and preferentially the ethers of fatty alcohols and of polyoxyethylene glycol, the esters of polyoxyethylene glycol and the blends of these surfactants.

This emulsion may also be characterised in that, for the associative thickening agent obtained by polymerization, the mass % of surfactants other than d)/polymer is between 1% and 5% in the polymerization.

This emulsion may also be characterised in that, for the associative thickening agent obtained by polymerization, the polymerization uses, as a % by weight, relative to the total weight of the associative thickening agent:

a) 20% to 60% by weight of at least one monomer which is (meth)acrylic acid, and preferentially methacrylic acid, b) 40% to 80% of at least one monomer which is an ester of (meth)acrylic acid, and preferentially ethyl acrylate, c) 0.5% to 25% of at least one monomer having at least one hydrophobic group, d) 0.1% to 10% by weight of at least one polyglycerol of formula (I), (I)

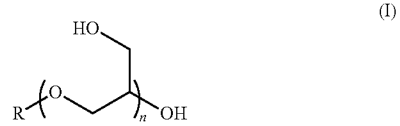

where R designates hydrogen, an ester group functionalized by an alkyl group, having 8 to 22 carbon atoms, or an alkyl group having 8 to 22 carbon atoms, and preferentially an alkyl group having 8 to 22 carbon atoms.

where the sum of the percentages a), b), c) and d) is equal to 100%.

This emulsion may also be characterised in that, for the associative thickening agent obtained by polymerization, the monomer containing at least one hydrophobic group has the general formula R—$(OE)_p$-$(OP)_q$—R', where:

p and q designate integers of less than or equal to 150, at least one of which is non-zero, with preferentially $q=0$ and $0<p<80$, OE and OP designate respectively ethylene oxide and propylene oxide, positioned in a random or regular manner, R designates a polymerisable group, and preferentially the methacrylate or methacrylurethane group, R' designates a hydrophobic group having at least 6 and at most 36 carbon atoms.

This emulsion may also be characterised in that, for the associative polymer obtained by polymerization, it has an average molecular mass by weight of between 20,000 g/mol and 1,000,000 g/mol, as measured by GPC.

Another object of the present invention is the use of any one or more of the emulsions described above, as a thickening agent of an aqueous formulation or an adhesive, where the aqueous formulation is preferentially a water-based paint, a thick film coating, or a filler.

Another object of the present invention concerns the use of the polyglycerol of formula (I) as a monomer to prepare by polymerization an associative thickening agent in the form of an aqueous emulsion.

The following examples will enable the present invention to be better apprehended, without however limiting its scope.

EXAMPLES

In each of the following examples, the molecular masses of the associative thickening agents are determined by GPC.

Synthesis of the thickening agents is well known to the skilled man in the art, and reference may be made in particular to the various documents cited in the Application as background concerning HASE technology.

The paints are formulated using the methods well known to the skilled man in the art. All the Brookfield™ viscosities of the paint formulations are determined at 25° C.

Example 1

This example illustrates the synthesis and use of the various associative thickening agents according to the invention (presence of polyglycerol during the synthesis), or outside the invention (without additives, with glycerol used during the synthesis or as a formulation agent, with polyglycerol added as a formulation surfactant).

The use in question occurs in a water-based paint formulation, the constitution of which is given in table 1; the figures indicate the mass in grams of each constituent.

TABLE 1

| | |
|---|---|
| Water | 294.0 |
| Ammonia 31% | 2.0 |
| Ecodis 40 (Coatex ™) | 3.0 |
| Acticide MBS (Thor ™) | 2.0 |
| Byk ™ 34 (Byk ™) | 1.0 |
| TiONA ™ 568 (Cristal ™) | 41.0 |
| Durcal 5 (Omya ™) | 328.0 |
| Omyacoat ™ 850 OG (Omya ™) | 215.0 |
| Axilat ™ DS 910 (Hexion ™) | 82.0 |
| Butyl diglycol | 20.0 |
| Thickening agent subject to testing | 12.0 * |

* the value of 12 grams is equal the mass of an emulsion containing 30% by dry weight of polymer (except for test n° 4 which uses 3.0 grams by dry weight of a commercial thickening agent in powder form)

Test n° 1:

This test illustrates a HASE thickening agent outside the invention, polymerized with a conventional surfactant.

This thickening agent results from the synthesis, expressed as a % by weight of the monomers, of:

a) 37.4% of methacrylic acid, b) 54.3% of ethyl acrylate, c) 8.3% of a monomer of formula (I), in which:
  where R designates the methacrylate group,
  q=0, p=25,
  where R' designates the hydrophobic group resulting from oxo alcohol having 16 carbon atoms.

In a 1-liter reactor, 485.4 grams of bipermuted water and 6.66 grams of sodium dodecyl sulphate and 11.5 g of non-ionic surfactant, which is isotridecyl alcohol condensed with 3 molecules of ethylene oxide, are weighed. The base of the tank is then heated to 72° C.±2° C.

During this time, a pre-emulsion is prepared by weighing the following in a beaker:

149 grams of bipermuted water, 2.33 grams of sodium dodecyl sulphate, 111.33 grams of methacrylic acid;

161.45 grams of ethyl acrylate, 24.6 grams of macromonomer of formula (I).

The mass of non-ionic surfactant therefore accounts in this case for 3.8% of the total mass of the manufactured polymer.

0.95 grams of ammonium persulphate is then weighed, diluted in 10 grams of bipermuted water for the first catalyst, and 0.095 grams of sodium metabisulphite diluted in 10 grams of bipermuted water for the second catalyst. When the base of the tank is at the required temperature, both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test n° 2:

This test illustrates a HASE thickening agent outside the invention, polymerized with a conventional surfactant.

This is the same thickening agent as that of test n° 1, in which the non-ionic surfactant has been replaced, in mass terms, by nonylphenol condensed with 4 molecules of ethylene oxide.

Test n° 3:

This test illustrates a HASE thickening agent outside the invention, polymerized with a conventional surfactant.

This is the same thickening agent as that of test n° 1, in which the non-ionic surfactant has been replaced, in mass terms, by a surfactant sold by the company Clariant™ under the name Polyglykol™ B11/150

Test n° 4:

This test illustrates a thickening agent outside the invention, formulated in water with the introduction of glycerol after polymerization.

The thickening agent is that of test n° 1, polymerized according to the technique described in test n° 1.

In the final solution with 30% by dry weight of active matter, 3% by dry weight of glycerol from the company Oleon™ relative to the dry weight of polymer is introduced.

Test n° 5:

This test illustrates a thickening agent outside the invention, formulated in water with the introduction of polyglycerol after polymerization.

The thickening agent is that of test n° 1, polymerized according to the technique described in test n° 1.

In the final solution with 30% by dry weight of active matter, 3% by dry weight, relative to the dry weight of polymer, of polyglycerol-3 of formula (I), with R=H, and n=3 sold by the company Solvay™, is introduced.

Test n° 6:

This test illustrates a thickening agent outside the invention, formulated in water with the introduction of polyglycerol after polymerization.

The thickening agent is that of test n° 1, polymerized according to the technique described in test n° 1.

In the final solution with 30% by dry weight of active matter, 3% by dry weight, relative to the dry weight of polymer, of hydrophobic polyglycerol, which is Chimexane™ NB of formula (I) with $R{=}C_{18}H_{35}$ and n=2 sold by the company Chimex™, is introduced.

Test n° 7:

This test illustrates a thickening agent outside the invention, polymerized in the presence of glycerol.

The thickening agent is that of test n° 1, polymerized according to the technique described in test n° 1, except that the non-ionic polymerization surfactant has been substituted, in mass terms, by glycerol from the company Oleon™.

Test n° 8:

This test illustrates a thickening agent according to the invention, polymerized in the presence of polyglycerol-3, which is the one used in test n° 6.

The thickening agent is that of test n° 1, polymerized according to the technique described in test n° 1, except that the non-ionic polymerization surfactant has been substituted, in mass terms, by the polyglycerol-3 of test n° 5.

Test n° 9:

This test illustrates a thickening agent according to the invention, polymerized in the presence of Chimexane™ NB, which is the one used in test n° 6.

The thickening agent is that of test n° 1, polymerized according to the technique described in test n° 1, except that the non-ionic polymerization surfactant has been substituted, in mass terms, by the Chimexane™ NB of test n° 6.

For each of these tests the Brookfield™ viscosities were determined at 25° C., at 10 and 100 revolutions per minute, at instants t=1 day ($\mu_{10\ 1D}$, $\mu_{100\ 1D}$) and t=7 days ($\mu_{10\ 7D}$, $\mu_{100\ 7D}$), where instant t=0 is the time of manufacture of the paint.

The results are shown in table 2.

TABLE 2

| Test n° | 1 | 2 | 3 | 4 | 5 |
|---|---|---|---|---|---|
| Outside Invention INvention | OI | OI | OI | OI | OI |
| $\mu_{10\ 1D}$ (mPa · s) | 6,600 | 6,500 | 6,800 | 5,600 | 6,200 |

TABLE 2-continued

| | | | | | |
|---|---|---|---|---|---|
| $\mu_{100\ 1D}$ (mPa · s) | 2,600 | 2,700 | 2,800 | 2,200 | 2,700 |
| $\mu_{10\ 7D}$ (mPa · s) | 7,500 | 7,700 | 7,850 | 5,900 | 6,400 |
| $\mu_{100\ 7D}$ (mPa · s) | 3,300 | 3,450 | 3,600 | 2,650 | 3,100 |
| $\Delta\mu_{10}$ (%) | 12 | 16 | 13 | 5 | 3 |
| $\Delta\mu_{100}$ (%) | 21 | 22 | 22 | 10 | 13 |

| Test n° | 6 | 7 | 8 | 9 |
|---|---|---|---|---|
| Outside Invention INvention | OI | OI | IN | IN |
| $\mu_{10\ 1D}$ (mPa · s) | 6,400 | 9,100 | 10,500 | 5,000 |
| $\mu_{100\ 1D}$ (mPa · s) | 2,800 | 3,600 | 3,800 | 2,100 |
| $\mu_{10\ 7D}$ (mPa · s) | 6,750 | 10,600 | 10,800 | 5,050 |
| $\mu_{100\ 7D}$ (mPa · s) | 3,150 | 4,900 | 3,900 | 2,100 |
| $\Delta\mu_{10}$ (%) | 5 | 14 | 3 | 1 |
| $\Delta\mu_{100}$ (%) | 13 | 27 | 3 | 0 |

These results demonstrate that only the thickening agents polymerized in the presence of a polyglycerol according to the invention enable the changes of viscosity of the paint after 7 days to be limited. With test n° 9, which represents the preferential variant of the invention, it is even possible to stabilise the paint's viscosity almost perfectly one week after its manufacture.

For the latter test, the Brookfield™ viscosity measurements at 10 and 100 revolutions per minute were repeated after 2 months: a variation of the viscosities of less than 3% of the initially measured values was observed, denoting excellent stability over time.

Example 2

This example illustrates the synthesis and use of different associative thickening agents, according to the invention (presence of polyglycerol during the synthesis), or outside the invention (without addition of polyglycerol during the synthesis).

The use in question occurs in a water-based paint formulation, the constitution of which is given in table 3; the figures indicate the mass in grams of each constituent.

TABLE 3

| | |
|---|---|
| Water | 281.0 |
| Ammonia 31% | 2.0 |
| Ecodis 40 (Coatex ™) | 3.0 |
| Acticide MBS (Thor ™) | 2.0 |
| Byk ™ 34 (Byk ™) | 1.0 |
| TiONA ™ 568 (Cristal ™) | 41.0 |
| Durcal 5 (Omya ™) | 328.0 |
| Omyacoat ™ 850 OG (Omya ™) | 215.0 |
| Axilat ™ DS 910 (Hexion ™) | 82.0 |
| Butyl diglycol | 20.0 |
| Thickening agent subject to testing | 24.0 * |

* the 24 grams are the mass of an emulsion containing 30% by dry weight of polymer Test n° 10:

This test illustrates a HASE thickening agent outside the invention, polymerized with a conventional surfactant.

This thickening agent results from the synthesis, expressed as a % by weight of the monomers, of:

a) 33.7% of methacrylic acid, b) 59.4% of ethyl acrylate, c) 6.9% of a monomer of formula (I), in which:

R designates the methacrylate group q=0, p=25,

R' designates the branched hydrophobic group with 16 carbon atoms.

In a 1-liter reactor, 288 grams of bipermuted water, 3.5 grams of sodium dodecyl sulphate and 11.5 g of non-ionic surfactant, which is isotridecyl alcohol condensed with 3 molecules of ethylene oxide, are weighed. The base of the tank is then heated to 72° C.±2° C.

During this time, a pre-emulsion is prepared by weighing the following in a beaker:

285 grams of bipermuted water, 3.5 grams of sodium dodecyl sulphate, 102.06 grams of methacrylic acid;

180 grams of ethyl acrylate, 21 grams of macromonomer of formula (I), 0.64 g of dodecylmercaptan.

The mass of non-ionic surfactant therefore accounts in this case for 3.6% of the total mass of the manufactured polymer.

0.95 grams of ammonium persulphate is then weighed, diluted in 10 grams of bipermuted water for the first catalyst, and 0.095 grams of sodium metabisulphite diluted in 10 grams of bipermuted water for the second catalyst. When the base of the tank is at the required temperature both catalysts are added and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test n° 11:

This test illustrates a thickening agent according to the invention, polymerized in the presence of polyglycerol-3 sold by the company Solvay™

The thickening agent is that of test n° 10, polymerized according to the technique described in test n° 10, except that the non-ionic polymerization surfactant has been substituted, in mass terms, by the polyglycerol-3 of test n° 5.

Test n° 12:

This test illustrates a thickening agent according to the invention, polymerized in the presence of Chimexane™ NB.

The thickening agent is that of test n° 10, polymerized according to the technique described in test n° 10, except that the polymerization surfactant has been substituted, in mass terms, by the Chimexane™ NB.

Test n° 13:

This test illustrates a HASE thickening agent outside the invention, polymerized with a conventional surfactant.

This thickening agent results from the synthesis, expressed as a % by weight of the monomers, of:

a) 35.57% of methacrylic acid, b) 52.43% of ethyl acrylate, c) 12% of a monomer of formula (I), in which:

R designates the methacrylate group, q=0, p=30,

R' designates the hydrophobic group consisting of 12 carbon atoms and derived from ethoxylation of an oxo alcohol consisting of 12 carbon atoms.

In a 1-liter reactor 485.4 grams of bipermuted water and 6.66 grams of sodium dodecyl sulphate and 11.5 g of a surfactant sold by the company Clariant™ under the name Polyglykol™ B11/150 are weighed. The base of the tank is then heated to 72° C.±2° C.

During this time, a pre-emulsion is prepared by weighing the following in a beaker:

149 grams of bipermuted water, 0.33 grams of sodium dodecyl sulphate, 105.8 grams of methacrylic acid;

155.9 grams of ethyl acrylate, 35.7 grams of macromonomer of formula (I).

The mass of surfactant therefore accounts in this case for 3.87% of the total mass of the manufactured polymer.

0.95 grams of ammonium persulphate is then weighed, diluted in 10 grams of bipermuted water for the first catalyst, and 0.095 grams of sodium metabisulphite diluted in 10 grams of bipermuted water for the second catalyst. When the base of the tank is at the required temperature both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the polymer obtained in this manner is filtered.

Test n° 14:

This test illustrates a thickening agent according to the invention, polymerized in the presence of polyglycerol-4 of the company Solvay™

The thickening agent is that of test n° 13, polymerized according to the technique described in test n° 13, except that the non-ionic polymerization surfactant has been substituted, in mass terms, by polyglycerol-4.

Test n° 15:

This test illustrates a thickening agent according to the invention, polymerized in the presence of Chimexane™ NB sold by the company Chimex™

The thickening agent is that of test n° 13, polymerized according to the technique described in test n° 13, except that the non-ionic polymerization surfactant has been substituted, in mass terms, by the Chimexane™ NB.

For each of these tests the Brookfield™ viscosities were determined at 25° C., at 10 and 100 revolutions per minute, at instants t=1 day ($\mu_{10\ 1D}$, $\mu_{100\ 1D}$) and t=7 days ($\mu_{10\ 7D}$, $\mu_{100\ 7D}$), where instant t=0 is the time of manufacture of the paint.

The results are shown in table 4.

TABLE 4

| Test n° | 10 | 11 | 12 |
|---|---|---|---|
| Outside Invention INvention | OI | IN | IN |
| $\mu_{10\ 1D}$ (mPa · s) | 7,700 | 8,500 | 8,200 |
| $\mu_{100\ 1D}$ (mPa · s) | 2,700 | 2,900 | 3,000 |
| $\mu_{10\ 7D}$ (mPa · s) | 8,100 | 8,600 | 8,300 |
| $\mu_{100\ 7D}$ (mPa · s) | 3,100 | 3,000 | 3,000 |
| $\Delta\mu_{10}$ (%) | 5 | 1 | 1 |
| $\Delta\mu_{100}$ (%) | 15 | 3 | 0 |
| **Test n°** | **13** | **14** | **15** |
| Outside Invention INvention | OI | IN | IN |
| $\mu_{10\ 1D}$ (mPa · s) | 7,300 | 7,000 | 7,100 |
| $\mu_{100\ 1D}$ (mPa · s) | 3,000 | 2,400 | 2,500 |
| $\mu_{10\ 7D}$ (mPa · s) | 8,700 | 7,500 | 7,600 |
| $\mu_{100\ 7D}$ (mPa · s) | 3,300 | 2,500 | 2,600 |
| $\Delta\mu_{10}$ (%) | 19 | 7 | 7 |
| $\Delta\mu_{100}$ (%) | 10 | 4 | 4 |

These results demonstrate that only the thickening agents polymerized in the presence of polyglycerols according to the invention enable the changes of viscosity of the paint after 7 days to be limited, and the best results are always obtained with the preferred variant of the invention.

The excellent result obtained with test n° 12 may be noted. For the latter test, the Brookfield™ viscosity measurements at 10 and 100 revolutions per minute were repeated after 1 month: a variation of viscosities of less than 5% of the initially measured values is observed.

As used herein the term (meth)acrylic means methacrylic and acrylic, and supports both terms. As used herein the terms composed of, contains, containing, and terms similar thereto, when referring to the ingredients, parts, reactants, etc., of a composition, component, etc., mean, in their broadest sense, "includes at least" (i.e., comprises) but also include within their definition all those gradually restricted meanings until and including the point where only the enumerated materials are included (e.g., consisting essentially of and consisting of).

The above written description of the invention provides a manner and process of making and using it such that any person skilled in this art is enabled to make and use the same, this enablement being provided in particular for the subject matter of the appended claims, which make up a part of the original description. As used herein, the phrases "selected from the group consisting of," "chosen from," and the like include mixtures of the specified materials. The term "mentioned" notes exemplary embodiments, and is not limiting to certain species. As used herein the words "a" and "an" and the like carry the meaning of "one or more."

Preferred embodiments herein, fully described and enabled, include:

1. An aqueous emulsion of an associative thickening agent comprising water and an associative thickening agent obtained by polymerization:

a) of at least one monomer which is (meth)acrylic acid, b) of at least one monomer which is an ester of (meth) acrylic acid, c) of at least one monomer having at least one hydrophobic group, in the presence of d) at least one polyglycerol of formula (I):

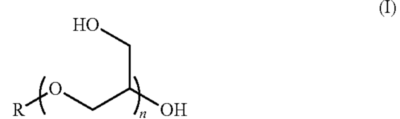

(I)

where R designates hydrogen, an ester group functionalized by an alkyl group, having 8 to 22 carbon atoms, or an alkyl group having 8 to 22 carbon atoms.

2. An emulsion according to embodiment 1, wherein the associative thickening agent is obtained by introducing into water compound(s) d) and any surfactant(s) other than the compound(s) d), followed by increasing the temperature of the medium, followed by introducing a polymerization initiator, and then monomers a), b) and c), the monomers optionally being added in combination with water and any surfactant(s) other than compound(s) d).

3. An emulsion according to embodiment 2, wherein surfactant(s) other than compound(s) d) are used, and are chosen from anionic surfactants.

4. An emulsion according to one of the embodiments 3, wherein the mass % of surfactant(s) other than d)/polymer is between 1% and 5% in the polymerization.

5. An emulsion according to embodiment 1, wherein the associative thickening agent is obtained by polymerizing, as a % by weight, relative to the total weight of the associative thickening agent:

a) 20% to 60% by weight of at least one monomer which is (meth)acrylic acid, b) 40% to 80% of at least one monomer which is an ester of (meth)acrylic acid, and c) 0.5% to 25% of at least one monomer having at least one hydrophobic group, in the presence of d) 0.1% to 10% by weight of at least one polyglycerol of formula (I)

where the sum of the percentages a), b), c) and d) is equal to 100%.

6. An emulsion according to embodiment 1, wherein the hydrophobic group of the monomer containing at least one hydrophobic group has at least 6 and at most 36 carbon atoms.
7. An emulsion according to embodiment 1, wherein the monomer containing at least one hydrophobic group has the general formula R—$(OE)_p$-$(OP)_q$—R', where:
p and q designate integers of less than or equal to 150, at least one of which is non-zero,
OE and OP designate respectively ethylene oxide and propylene oxide,
R designates a polymerisable group,
R' designates a hydrophobic group having at least 6 and at most 36 carbon atoms.
8. An emulsion according to embodiment 1, wherein the associative thickening agent has an average molecular mass by weight of between 20,000 g/mol and 1,000,000 g/mol, as measured by GPC.
9. An emulsion according to embodiment 1, wherein a) is methacrylic acid and b) is ethyl acrylate.
10. An emulsion according to embodiment 3, wherein the anionic surfactants are selected from among sodium dodecyl sulphate, dioctyl sodium sulfosuccinate, sodium dodecylbenzenesulfonate, and mixtures thereof.
11. An emulsion according to embodiment 2, wherein surfactant(s) other than compound(s) d) are used, and are chosen from non-ionic surfactants.
12. An emulsion according to embodiment 11, wherein the non-ionic surfactants are selected from ethers of fatty alcohols and of polyoxyethylene glycol, esters of polyoxyethylene glycol, and mixtures thereof.
13. An emulsion according to embodiment 7, wherein a) is methacrylic acid and b) is ethyl acrylate.
14. A process, comprising combining the associative thickening agent of embodiment 1 with another material.
15. The process according to embodiment 15, wherein the material is a water-based paint, an adhesive, a thick film coating or a filler.
16. An aqueous formulation comprising the emulsion according to embodiment 1.
17. An aqueous formulation according to embodiment 16, wherein the formulation is an adhesive, a water-based paint, a thick film coating, or a filler.
18. An associative thickening agent obtained by polymerization:
a) of at least one monomer which is (meth)acrylic acid,
b) of at least one monomer which is an ester of (meth) acrylic acid, and
c) of at least one monomer having at least one hydrophobic group, in the presence of d) at least one polyglycerol of formula (I):

(I)

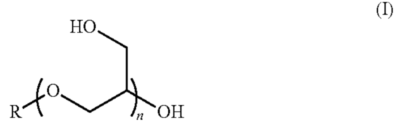

where R designates hydrogen, an ester group functionalized by an alkyl group, having 8 to 22 carbon atoms, or an alkyl group having 8 to 22 carbon atoms.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

When a polymer is referred to as comprising a monomer, the monomer is present in the polymer in the polymerized form of the monomer. However, for ease of reference the phrase comprising, containing, etc. the (respective) monomer or the like is used as shorthand.

The invention claimed is:

1. An aqueous emulsion of an associative thickening agent comprising water and an associative thickening agent obtained by polymerization:
a) of at least one monomer which is (meth)acrylic acid,
b) of at least one monomer which is an ester of (meth) acrylic acid, and
c) of at least one monomer having at least one hydrophobic group, in the presence of d) at least one polyglycerol of formula (I):

(I)

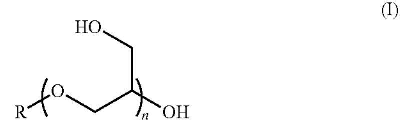

where n is 2 or 3 and R designates hydrogen, an ester group functionalized by an alkyl group having 8 to 22 carbon atoms, or an alkyl group having 8 to 22 carbon atoms.

2. An emulsion according to claim 1, wherein the associative thickening agent is obtained by introducing into water compound(s) d) and any surfactant(s) other than the compound(s) d), followed by increasing the temperature of the medium, followed by introducing a polymerization initiator, and then monomers a), b) and c), the monomers optionally being added in combination with water and any surfactant(s) other than compound(s) d).

3. An emulsion according to claim 2, wherein surfactant(s) other than compound(s) d) are used, and are selected from the group consisting of anionic surfactants.

4. An emulsion according to one of the claims 3, wherein the mass % of surfactant(s) other than d)/polymer is between 1% and 5% in the polymerization.

5. An emulsion according to claim 1, wherein the associative thickening agent is obtained by polymerizing, as a % by weight, relative to the total weight of the associative thickening agent:
a) 20% to 60% by weight of at least one monomer which is (meth)acrylic acid,
b) 40% to 80% of at least one monomer which is an ester of (meth)acrylic acid, and c) 0.5% to 25% of at least one monomer having at least one hydrophobic group, in the presence of d) 0.1% to 10% by weight of at least one polyglycerol of formula (I)

where the sum of the percentages a), b), c) and d) is equal to 100%.

6. An emulsion according to claim 1, wherein the hydrophobic group of the monomer containing at least one hydrophobic group has at least 6 and at most 36 carbon atoms.

7. An emulsion according to claim 1, wherein the monomer containing at least one hydrophobic group has the general formula R—$(OE)_p$-$(OP)_q$—R', where:

p and q designate integers of less than or equal to 150, at least one of which is non-zero, OE and OP designate respectively ethylene oxide and propylene oxide, R designates a polymerisable group, R' designates a hydrophobic group having at least 6 and at most 36 carbon atoms.

8. An emulsion according to claim 1, wherein the associative thickening agent has weight average molecular weight of between 20,000 g/mol and 1,000,000 g/mol, as measured by GPC.

9. An emulsion according to claim 1, wherein a) is methacrylic acid and b) is ethyl acrylate.

10. An emulsion according to claim 3, wherein the anionic surfactants are selected from the group consisting of sodium dodecyl sulphate, dioctyl sodium sulfosuccinate, sodium dodecylbenzenesulfonate, and mixtures thereof.

11. An emulsion according to claim 2, wherein surfactant(s) other than compound(s) d) are used, and are selected from the group consisting of non-ionic surfactants.

12. An emulsion according to claim 11, wherein the nonionic surfactants are selected from the group consisting of ethers of fatty alcohols and of polyoxyethylene glycol, esters of polyoxyethylene glycol, and mixtures thereof.

13. An emulsion according to claim 7, wherein a) is methacrylic acid and b) is ethyl acrylate.

14. A process, comprising combining the associative thickening agent of claim 1 with another material.

15. The process according to claim 14, wherein the material is selected from the group consisting of a water-based paint, an adhesive, a thick film coating and a filler.

16. An aqueous formulation comprising the emulsion according to claim 1.

17. An aqueous formulation according to claim 16, wherein the formulation is selected from the group consisting of an adhesive, a water-based paint, a thick film coating, and a filler.

18. An associative thickening agent obtained by polymerization:

a) of at least one monomer which is (meth)acrylic acid, b) of at least one monomer which is an ester of (meth) acrylic acid, and c) of at least one monomer having at least one hydrophobic group, in the presence of d) at least one polyglycerol of formula (I):

(I)

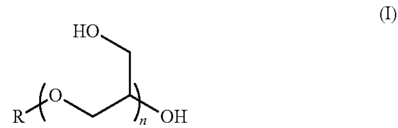

where n is 2 or 3 and R designates hydrogen, an ester group functionalized by an alkyl group having 8 to 22 carbon atoms, or an alkyl group having 8 to 22 carbon atoms.

19. An emulsion according to claim 1, wherein n is 2.

20. An emulsion according to claim 1, wherein n is 3.

* * * * *